US009917867B2

(12) United States Patent
Sallam (10) Patent No.: US 9,917,867 B2
(45) Date of Patent: Mar. 13, 2018

(54) CONDUCTING ONLINE MEETINGS WITH INTELLIGENT ENVIRONMENT CONFIGURATION

(71) Applicant: Citrix Systems, Inc., Fort Lauderdale, FL (US)

(72) Inventor: Ahmed Said Sallam, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 340 days.

(21) Appl. No.: 14/708,690

(22) Filed: May 11, 2015

(65) Prior Publication Data

US 2016/0337459 A1    Nov. 17, 2016

(51) Int. Cl.
H04L 12/28    (2006.01)
H04L 29/08    (2006.01)
H04L 29/06    (2006.01)

(52) U.S. Cl.
CPC ........ H04L 65/403 (2013.01); H04L 12/2823 (2013.01); H04L 67/12 (2013.01); H04L 67/22 (2013.01); H04L 67/24 (2013.01)

(58) Field of Classification Search
CPC .... G06F 1/3231; G06F 17/24; G06F 17/3089; G05D 23/1917; G05D 23/1932; G06Q 10/10; H04L 41/06–41/0861; H04L 12/1822–12/2829
See application file for complete search history.

(56) References Cited

U.S. PATENT DOCUMENTS

| | | | | |
|---|---|---|---|---|
| 2007/0288610 A1* | 12/2007 | Saint Clair | ............. | H04L 41/06 709/220 |
| 2012/0158203 A1* | 6/2012 | Feldstein | .............. | G06F 1/3231 700/295 |
| 2012/0254220 A1* | 10/2012 | Verthein | ................ | G06Q 10/10 707/769 |
| 2013/0063065 A1* | 3/2013 | Berman | .............. | H04L 12/2827 318/480 |

(Continued)

OTHER PUBLICATIONS

"Heating / Ventilation / Air Conditioning Room Climate Control with ABB i-bus® KNX" paper published in 2011.*

(Continued)

*Primary Examiner* — Wing F Chan
*Assistant Examiner* — Raji Krishnan
(74) *Attorney, Agent, or Firm* — BainwoodHuang (57) ABSTRACT

A computer-implemented method of conducting online meetings includes gathering sensed environment information from a set of intelligent sensor devices in physical user environments, along with meeting information describing online meetings in which the users participate while located in the respective environments. The sensed environment information and meeting information are stored in an event database, intelligent environment-control devices in the physical user environments are configured for subsequent online meetings. The configuring includes operating a stateful behavioral engine using the sensed environment information and meeting information from the event database to identify patterns of user behavior and to configure the intelligent environment-control devices according to the identified patterns of user behavior.

22 Claims, 6 Drawing Sheets

(56) References Cited

U.S. PATENT DOCUMENTS

| | | | |
|---|---|---|---|
| 2014/0108084 A1* | 4/2014 | Bargetzi | G06Q 10/1095 |
| | | | 705/7.19 |
| 2014/0108538 A1 | 4/2014 | Borzycki et al. | |
| 2014/0244834 A1 | 8/2014 | Guedalia et al. | |
| 2015/0355649 A1* | 12/2015 | Ovadia | G05D 23/1917 |
| | | | 704/233 |
| 2016/0007425 A1* | 1/2016 | Roosli | H05B 37/0227 |
| | | | 315/297 |
| 2016/0277242 A1* | 9/2016 | Sallam | H04L 41/0816 |
| 2017/0127372 A1* | 5/2017 | Patel | H04W 64/00 |
| 2017/0223807 A1* | 8/2017 | Recker | H05B 37/0227 |

OTHER PUBLICATIONS

Bai et al "Automatic Room Light Intensity Detection and Control Using a Microprocessor and Light Sensors" 2008 IEEE publication.*

* cited by examiner

CONDUCTING ONLINE MEETINGS WITH INTELLIGENT ENVIRONMENT CONFIGURATION

BACKGROUND

A typical web meeting shares visual content and audio content among multiple web meeting members. In particular, each web meeting member connects a respective user device to a central web meeting server over a computer network. Once the user devices of the web meeting members are connected with the central web meeting server, the members are able to watch visual content, as well as ask questions and inject comments to form a collaborative exchange even though the web meeting members may be scattered among different locations.

SUMMARY

With modern trends of widespread use of electronic devices, users have more devices that are available to them for use in online meetings. For example, there are more mobile devices such as smartphones and tablet computers. There are also more specialized devices that incorporate intelligence so as to usable in conjunction with other computerized devices. Examples include devices such as smart televisions and cameras having WiFi or Bluetooth connectivity and programmability.

Advantageously, improved techniques for conducting online meetings involve automatic configuring of physical user environments through use of intelligent devices including sensor devices and environment-control devices. As an example, an intelligent thermostat functions as an intelligent sensor reporting temperature online meeting server equipment including a behavioral engine that uses reported information to identify patterns of user behavior and configure physical environments for online meetings accordingly. Specifically, the behavioral engine configures the environment-control devices. As an example, it may program a target temperature into an intelligent thermostat. The disclosed techniques essentially integrate a variety of intelligent devices into online meeting infrastructure, enhancing user experiences in the online meetings.

One embodiment is directed to a computer-implemented method of conducting online meetings among users associated with respective physical user environments. The method includes gathering, by processing circuitry, sensed environment information from a set of intelligent sensor devices in the physical user environments, the sensed environment information being gathered along with meeting information describing respective online meetings in which the users participate while located in the respective physical user environments. The method further includes storing, by the processing circuitry, the sensed environment information and meeting information in an event database, and configuring, by the processing circuitry, intelligent environment-control devices in the physical user environments for subsequent online meetings. The configuring includes operating a stateful behavioral engine using the sensed environment information and meeting information from the event database to identify patterns of user behavior and to configure the intelligent environment-control devices according to the identified patterns of user behavior.

In some arrangements, the intelligent sensor devices include temperature sensing devices and light sensing devices, and the intelligent environment-control devices include temperature-control devices and illumination-control devices.

In some arrangements, gathering sensed environment information includes reading device setting from respective sensor devices, and configuring the intelligent environment-control devices includes writing device settings to the intelligent environment-control devices. In some arrangements, the processing circuitry executes a stateful behavioral engine capable of representing spatiality as well as sources of environmental conditions and to configure the intelligent environment-control devices in accordance with represented spatiality and sources of environmental conditions. The represented spatiality and sources of environmental conditions may include one or both of (1) location and direction of incoming sunlight and (2) location and intensity of artificial light.

In some arrangements, the configuring includes resetting environment-control devices to default or stored previous settings upon completion of a meeting.

In some arrangements, the method further includes gathering, by the processing circuitry from an enterprise directory database, information describing enterprise buildings and/or rooms for meetings and describing enterprise users participating in meetings, the information being used in the configuring of the environment-control devices.

In some arrangements, both the gathering and the configuring include using device communication agents to carry out device-specific communications with the sensor devices and the environment-control devices. These can include use of standard or proprietary protocols. Examples include Bluetooth, WiFi, etc.

In some arrangements, the method further includes providing selected information to a super behavioral engine, the super behavioral engine receiving selected information from a plurality of behavioral engines, and processing the received selected information to derive cross-user behavior information describing behavior for multiple users. The cross-user behavior information is received from the super behavioral engine and used in the configuring of the environment-control devices.

In some arrangements, the method further includes establishing presence and identification of users in the user environments. This may employ specialized biometric devices and/or technologies such as facial recognition, etc.

Another embodiment is directed to online meeting server equipment that includes a communications interface, memory, storage, and one or more processors coupled to the communications interface, the memory and the storage. The memory stores computer program instructions executed by the processors to form processing circuitry causing the online meeting server equipment to perform a method of conducting online meetings among users associated with respective physical user environments, the method including:

gathering, by the processing circuitry, sensed environment information from a set of intelligent sensor devices in the physical user environments, the sensed environment information being gathered along with meeting information describing respective online meetings in which the users participate while located in the respective physical user environments;

storing, by the processing circuitry, the sensed environment information and meeting information in an event database; and configuring, by the processing circuitry, intelligent environment-control devices in the physical user environments for subsequent online meetings, the configuring including operating a stateful behavioral engine using the sensed environment information and meeting information from the event database to identify patterns of user behavior and to configure the intelligent environment-control devices according to the identified patterns of user behavior.

In some arrangements, the online meeting server equipment may incorporate additional features or specifics as outlined above for the computer-implemented method.

Another embodiment is directed to a computer program product having a non-transitory computer-readable medium storing a set of computer program instructions, the computer program instructions being executable by processing circuitry of computer equipment to cause the computer equipment to conduct online meetings among users associated with respective physical user environments, by:

gathering, by the processing circuitry, sensed environment information from a set of intelligent sensor devices in the physical user environments, the sensed environment information being gathered along with meeting information describing respective online meetings in which the users participate while located in the respective physical user environments;

storing, by the processing circuitry, the sensed environment information and meeting information in an event database; and configuring, by the processing circuitry, intelligent environment-control devices in the physical user environments for subsequent online meetings, the configuring including operating a stateful behavioral engine using the sensed environment information and meeting information from the event database to identify patterns of user behavior and to configure the intelligent environment-control devices according to the identified patterns of user behavior.

In some arrangements, the computer program instructions on the computer-readable medium may cause the computer equipment to incorporate additional or more specific functions and features as outlined above for the computer-implemented method.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

A behavioral engine is coupled to smart devices (sensors, actuators, etc.), collecting environmental contextual information (location, temperature, lightening, wind, special coordinates, distances, etc.) along with meeting participants' behaviors, decisions and choices at online meetings, to establish a record of communication and behavior patterns and how they differ based on surrounding environmental conditions. This information is used to automate configuration of environment-control devices in meeting environments and improve the quality the services delivered at meetings. Collected information is aggregated and correlated at central servers (on premise or cloud based), according to privacy and security compliance rules as may be set by individual users and system administrators, to further guide decision making across meeting sessions, sharing certain characteristics such as location, user identities, temperature, etc.

Figure 1:
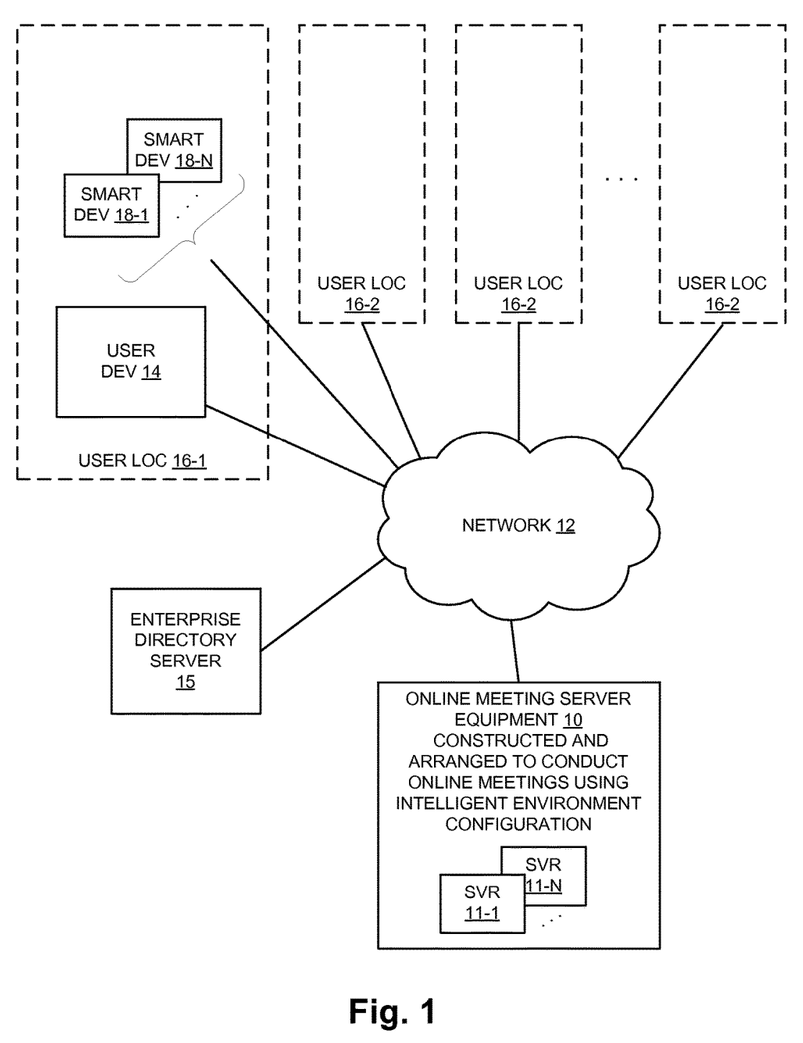
FIG. 1 is a block diagram of a computer system.

FIG. 1 shows a system in which online meetings or similar collaborative exchanges among system users are performed. The system includes online meeting server equipment 10 which is constructed and arranged to conduct online meetings with intelligent environment configuration as described herein. The online meeting server equipment 10, which generally includes one or more server computers (SVR) 11-1, 11-2 etc. is connected to a network 12 to which are also connected user devices 14 at respective user locations (USER LOC) 16-$x$ ($x$=1, 2, . . . n). The user locations 16 may be uniquely associated with respective individual users, e.g., as their home locations or personal offices in a corporate office building, or in other cases they may be relatively public locations generally occupied by different users at different times. As shown, the system may also include an enterprise directory server 15 that maintains and provides information about enterprise offices, topology, location, coordinates, set-up, etc. along with users information. Objects in the enterprise directory have respectively globally unique IDs (GUID).

At each user location 16 is one or more user computing devices (USER DEV) 14 and some number of intelligent environment-control devices, or "smart devices" (SMART DEV), 18. A user computing device, or user device, 14 is capable of executing application software such as the client side of an online meeting application. Thus a user device 14 has processing circuitry and memory storing such application software along with other software such as an operating system, device drivers, etc. Examples of computing devices 14 include a desktop or portable personal computer, tablet computer, smartphone, etc. A user device 14 typically has its own directly connected I/O components, such as a display screen, a speaker, a built-in microphone and perhaps a built-in camera. The smart devices 18 have respective primary functions generally unrelated to computer technology per se, as described more below, as well as communications and processing ability or "intelligence" that enables them to be integrated into computer systems.

Regarding the primary functions, below are examples of types of intelligent devices 18 that may be employed:

Thermostats
Air handlers/vents
Window shades/blinds
Lighting devices (lamps)
Motion sensors
Doors, windows
Monitoring devices (cameras, microphones, etc.)
Ancillary equipment (whiteboards, projectors, etc.)

The smart devices 18 may be classified as one or both of sensor-type devices or environment-control type devices. A thermostat can be an example of both—it senses (and reports) temperature, and it also controls operation of a heater or cooler according to a programmed target temperature. A smart window shade might be an example of a device having only an environment-control function—blocking the entry of light according to a programmed position of the shade. A motion sensor is a good example of a device 18 having only sensor functionality.

Regarding the "intelligence" aspect of the devices 18, below are example technical characteristics:

1. Network connectivity with a local gateway via proprietary or standard protocols (e.g., Bluetooth, WiFi, Zigbee), or connected directly to a cloud server or via public Internet.
2. A device-specific sensing or environment-control function.
3. A micro-controller and persistent memory to store and execute computational logic.
4. A programmable command and control application programming interface (API) to query recorded operational data and send commands specific to device functions.

In operation, users participate in online meetings by establishing meeting sessions between their respective computing devices 14 and the online meeting server equipment 10. In conventional systems this is effectively the limit of connection, and the users are responsible for interacting with any local environment-control devices to obtain desired environmental conditions for the meeting. A typical example would be to point a camera in a certain direction, close window shades, turn down lights, move closer to a microphone, etc. In the system of FIG. 1, the environment of online meetings is enhanced by the automated configuring and use of the smart devices 18. Details of the configuring and use of the smart devices 18 are described more below.

Figure 2:
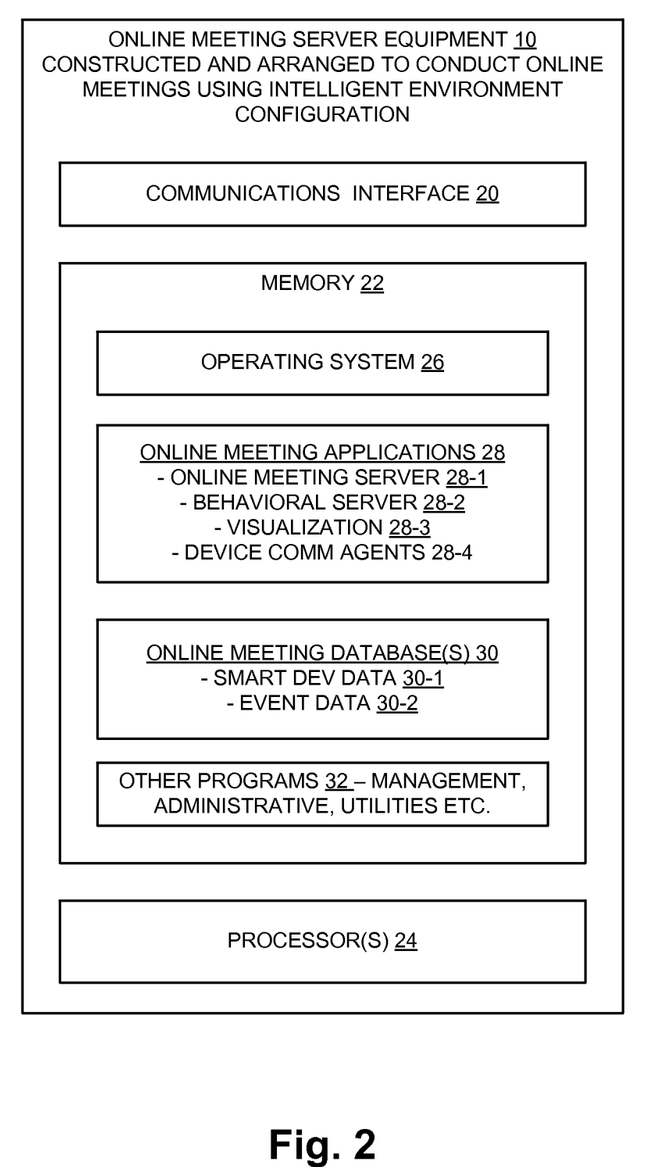
FIG. 2 is a block diagram of online meeting server equipment.

FIG. 2 shows the online meeting server equipment 10. It is typically realized by one or more computers, e.g., server computers 11 (FIG. 1), which may be located in a corporate data center, web farm, cloud computing facility(ies), or some mixture thereof. The equipment includes a communications interface 20, memory 22 and processor(s) 24. The memory 22 and processors 24 collectively form processing circuitry that executes application software and other computer program instructions to realize functionality as described herein. The communications interface 20 provides connections to the network 12 and perhaps other external systems or devices, such as locally attached secondary storage (not shown) for example.

As shown, the memory 22 stores software including an operating system 26 and online meeting applications 28 that are executed by the processors 24. The online meeting applications 28 include an online meeting server 28-1 that provides the core online meeting experience, i.e., receiving, mixing and distributing audio and video, presenting control and monitoring interfaces to participants, etc. The online meeting applications 28 also include applications that provide automated environment control. These can include a behavioral server 28-2 and a visualization application 28-3, whose constitution and operation are described more below. It also includes device communication agents 28-4 that carry out lower-level communications with the smart devices 18 using respective protocols such as outlined above.

The memory 22 also stores data that is used by the online meeting applications 28, shown as online meeting databases 30. Example data include device data 30-1 as well as event data 30-2. As described more below, the smart device data database 30-1 stores information about the smart devices 18 to enable them to be used in online meetings. The event database 30-2 captures events and information from the smart devices 18 along with data about meetings and their participants (users).

Briefly, the behavioral server 28-2 is where a behavioral engine (BE) resides that collects events from the smart devices 18 and stores event data 30-2, and uses the stored information in configuring the smart devices 18 for online meetings. A fuller description of operation is given below.

The visualization application 28-3 provides visual representation of all data and events available to the system including:

a. Directory static information: names, ID, locations and capabilities of smart devices 18
b. Current and historical dynamically collected behavioral events
c. Current and historical aggregated behavioral events
d. Current and historical policy decisions enforced by the system As shown, the memory 22 may also store other programs 32 such as management or administrative applications, utilities, etc. A management server can provide graphical and scripting user interfaces (UIs) to system administrators to configure system operations and query primitive and aggregated events.

The behavioral engine (BE) within the behavioral server 28-2 collects data from all smart devices 18 (device-resident sensors, "Internet of Things" or IoT sensors, etc.) available and accessible during meeting sessions. It also collects users' and administrators' settings prior to, during and after meetings, and predicts settings for subsequent meetings and sends control commands to devices 18 to adjust their functions accordingly.

The BE understands locations and room topology to be able to tell where sunlight is coming from, etc. It also understands temperature, illumination (both natural and artificial), light direction and intensity across both time (e.g., time of year) and space (e.g., across multiple buildings of a campus or around different sides of a building). Time-of-year light information may be obtained from national weather databases for example, and/or by self-monitoring of light and temperature through the year and across all buildings.

The BE knows the concept of rooms and buildings, established via different methods:
- Configured by a system administrator or system users as they provide detailed building maps.
- Located via GPS obtained coordinates collected from users devices and smart sensors.
- Obtained via local WiFi, Ethernet or BT network information.

The BE knows how to aggregate and correlate info across meetings rooms located in same floor, building, side of building, etc. It also knows about system users via information from enterprise directory servers 15, such as Microsoft Active Directory.

The BE operates to adjust environmental conditions for meetings by issuing control commands to the intelligence within the smart devices 18. This configuring occurs before and perhaps during meetings. When meetings are completed, the BE may reset environmental conditions to either a default condition or to the condition existing just prior to the beginning of the meeting. This may be done in a way to conserve energy for instance, by closing window blinds during hot weather and adjusting thermostat temperature accordingly.

The BE may work together with a cloud-based super BE, not shown, which aggregates and correlates insights collected from multiple BEs and provides further insights and recommendations to individual BEs.

The BE code may run and execute in any of the following:
- Dedicated gateway devices inside office locations, homes, hotels, etc.
- Secure isolated containers on computing devices (mobile phones, desktops, laptops, etc.)
- Remote cloud servers.

On-premise physical and virtual servers.

The BE generally may take into consideration various aspects including:

Users personal convenient preferences, adjustments, etc.

Best environmental settings to conserve energy.

System administrators' policies and configuration settings.

The BE knows how to establish users' presence and may augment user identification and security using methods such as the following:

Motion sensors.

Devices GPS locations.

Biometric authentication sensors.

Facial and sound recognition.

Figure 3:
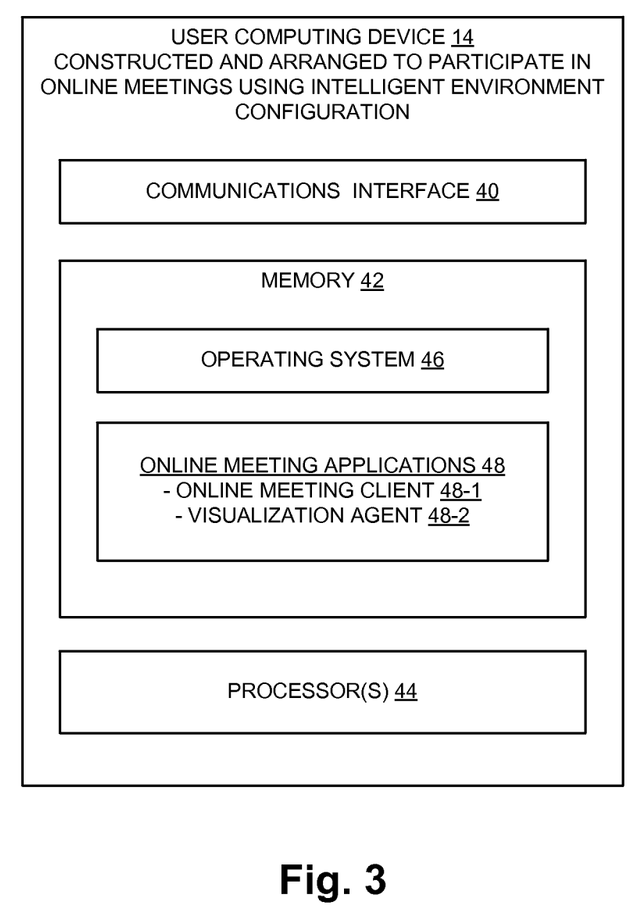
FIG. 3 is a block diagram of a user computing device.

FIG. 3 shows a user device 14. As mentioned above, it is typically a personal computing device such as a personal computer, tablet computer, etc. It may have a fixed location, such as a user's home or office, or it may be a mobile device. The user device 14 includes a communications interface 40, memory 42 and processor(s) 44. The memory 42 and processors 44 collectively form processing circuitry that executes application software and other computer program instructions to realize functionality as described herein. The communications interface 40 provides connections to the network 12 and perhaps other external systems or devices.

As shown, the memory 42 stores software including an operating system 46 and online meeting applications 48 that are executed by the processors 44. The online meeting applications 48 include an online meeting client 48-1 that works with the online meeting server 28-1 of the online meeting server equipment 10 to provide the core online meeting experience to the local user, i.e., forwarding locally captured audio and video to the online meeting server equipment 10 and receiving and rendering mixed audio and video that is generated by the online meeting server equipment 10 and distributed to the participants. The online meeting applications 48 also may include applications that enable the local user to interact with the overall environment-control system realized by operation of the behavioral server 28-2 etc. An example of such an application is a visualization agent 48-2 that works in conjunction with the visualization program 28-3 of the online meeting server equipment 10 to provide certain system-level functionality as described herein.

Figure 4:
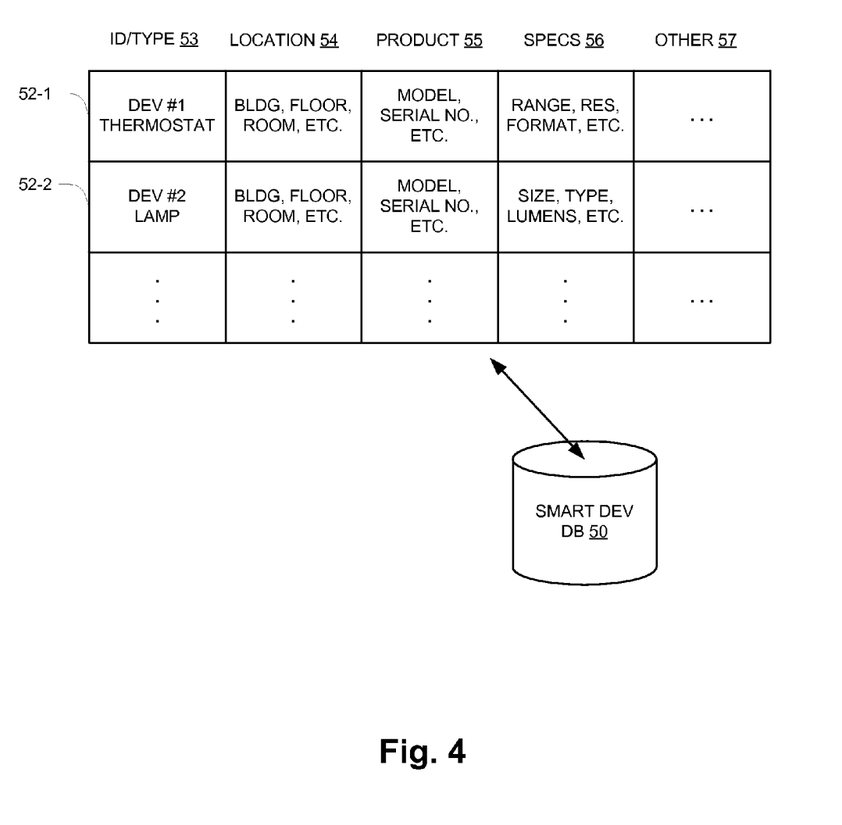
FIG. 4 is a schematic diagram of an intelligent device database.

FIG. 4 illustrates certain data that can be used in providing the intelligent environment configuring as described herein. Specifically, a smart device database (DEV DB) 50 stores a variety of data about the smart devices 18 that are owned or otherwise controlled by an enterprise, such as a corporation or other business that deploys and operates the online meeting server equipment 10 to provide online meeting services usable by its employees, customers, etc. The smart device database 50 is part of the online meeting server equipment 10.

FIG. 4 shows example records 52-1, 52-2 of the smart device database 50. As indicated at the top, the fields for the records 52 include an identity (ID) and type field 53, location field 54, product field 55, specifications (SPECS) field 56, and other fields 57. The ID/type field 53 includes information identifying a particular smart device 18. In the illustrated example this field includes a type description such as "thermostat" or "lamp" for the device as well as an associated device ID number, which may be assigned by the system for purposes of distinguishing the device from all other devices. The location field 54 includes location information such as building, floor, room/office, etc. The product field 55 contains information identifying the device as a distinct product. For example, there may be a model name or number, a manufacturer's serial number, etc. The specifications field 56 provides data regarding the capabilities of the device. For the example thermostat record 52-1, this information might include the temperature range (RANGE), resolution (RES), format (e.g., Fahrenheit/Centigrade), etc. The example display record 52-2 includes analogous information for a lamp.

When configuring environments for online meetings, the online meeting applications 28 may treat the presence and contents of the smart device database 50 as given, created and maintained in a separate process. For example, there may be a database application and a specific manager or administrator in the organization who is responsible for maintaining the smart device database 50, apart from its connection or use with online meetings or any other application. Alternatively, the online meeting applications 28 may be involved in some manner in maintaining the smart device database 50, such as for example providing device information gathered as part of the online meeting operations. The smart device database 50 provides at least a query interface that enables the online meeting applications 28 to retrieve device data for use in configuring the environments for online meetings.

Figure 5:
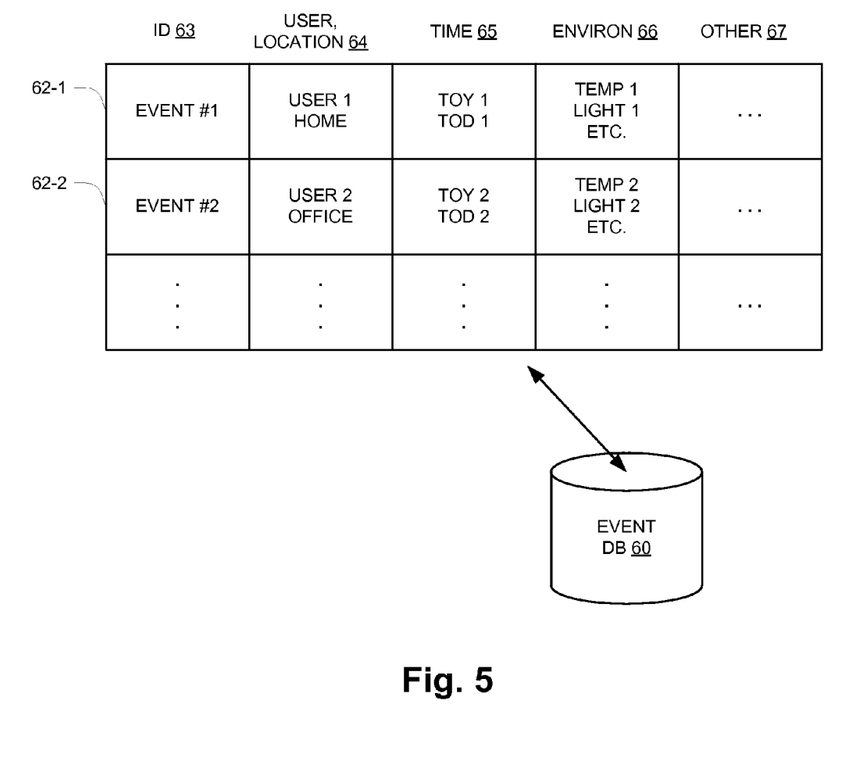
FIG. 5 is schematic diagram of an event database.

FIG. 5 illustrates certain additional data that can be used in configuring meeting environments as described herein. Specifically, an event database (EVENT DB) 60 stores a variety of data collected from the smart devices 18, including from sensor-type devices included within the set of smart devices 18. Examples include thermostats sensing temperature, illumination sensors sensing light intensity, etc. This information can be gathered in connection with online meetings over a period of time and used by the behavior engine (BE) to make educated guesses for configuring the environments for subsequent online meetings. The event database is 60 is one of the online meeting databases 30 and is maintained by the online meeting applications 28, specifically by the behavioral server 28-2 working in conjunction with the device communication agents 28-4.

FIG. 5 shows example records 62-1, 62-2 of the event database 60. As indicated, the fields for the records 62 include an identity (ID) field 63, user and location field 64, time field 65, environment field 66, and other fields 67. The ID field 63 is a unique identifier of an event, e.g., a temperature reading at a particular time and location. The user and location field 64 stores information identifying a location 16 at which the event occurred, as well as a respective user occupying that location 16 at that time. The time field 64 stores both a time of year (TOY), typically in the form of a date, as well as a time of day (TOD), typically in the form of a clock time (hours, minutes, seconds) which may be a local time or a location-independent or "universal" time (UTC). The environment field 66 stores the sensed environment information that is the subject of the event. This might be a temperature, a light intensity, etc.

As mentioned, the event database 60 is maintained by the online meeting applications 28, and thus provides a write/update type of interface used by the online meeting applications 28 for that purpose. The event database 60 also provides a query interface that enables the online meeting applications 28 (specifically the BE of the behavioral server 28-2) to retrieve event data for use in configuring the environments for online meetings.

Figure 6:
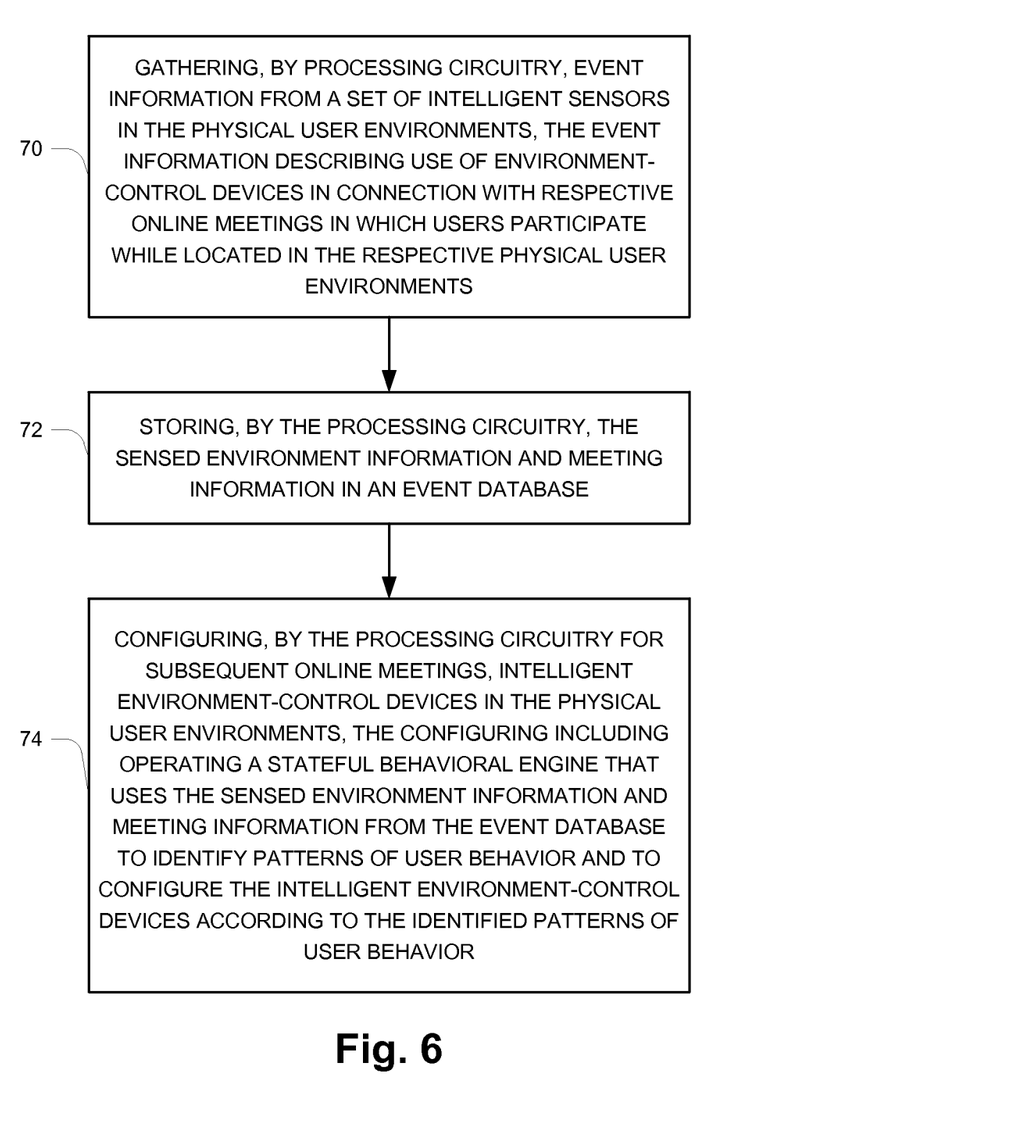
FIG. 6 is a flow diagram of operation of online meeting server equipment.

FIG. 6 illustrates high-level operation of the online meeting server equipment 10, specifically the processing circuitry (memory 22 and processors 24) executing the online meeting applications 28.

At 70, the processing circuitry gathers event information from intelligent sensors in physical user environments, i.e., respective user locations 16. An intelligent sensor is a sensing type of smart device 18. The event information describes use of intelligent devices 18 in connection with respective online meetings in which users participate while located in the respective physical user environments. Specifically the event information describes use of devices 18 referred to as "environment control" devices, examples of which are given above (smart thermostats, window shades, etc.). Regular ongoing use of the gathering step 70 populates the event database 60 with a rich set of data that reflects user behavior in meetings, such as whether a window shade is drawn, the lighting level, the use of particular cameras or other devices, etc. The event information is gathered by the BE of the behavioral server 28-2 working in conjunction with the device communication agents 28-4 of online meeting server equipment 10 (FIG. 2). More specifically, the device communication agents 28-4 communicate with the devices 18 using the respective communication protocols (e.g., the wireless protocols discussed above), and using these protocols identify and locate the devices and read their device data, then forward this information on to the BE.

At 72, the processing circuitry stores the gathered event information in an event database, e.g., the event database 60 (FIG. 5).

At 74, the processing circuitry configures intelligent environment-control devices 18 in the physical user environments (e.g., user locations 16) for subsequent online meetings. The configuring includes operating a stateful behavioral engine (e.g., BE of behavioral server 28-2) that uses the event information from the event database 60 to identify patterns of user behavior and to configure the intelligent environment-control devices 18 according to the identified patterns of user behavior. As an example, a pattern of user behavior might be the use of certain lighting devices and/or certain adjustment of window shades at a certain user location 16 for meetings occurring at a particular time (e.g., late afternoon). When a subsequent meeting involves the same user at the same location 16 and approximate same time, the BE can automatically turn on the same (smart) lighting devices and make the same adjustment to the (smart) window shades.

It should be noted that the configuring at 74 may be done only prior to initiation of an online meeting, or the system may be capable of dynamically configuring devices 18 at any time, including after a meeting has started. Such dynamic capability provides additional flexibility and convenience to users. For example, users can see the available devices 18 and thus have a sense of what kind of environment control can be achieved, and users may also be able to exert some level of control over the use of local devices consistent with privacy concerns, etc.

Beyond the low-level configuring of devices 18 for use in online meetings as described above, the online meeting applications 28 and 48 also provide additional functionality for efficiency and richness as well as in support of other aspects of system operation, such as system management. An example includes the functionality of the visualization application 28-3 and visualization agent 48-2 that includes enabling a user or administrator to obtain instantaneous visual representation of data and events available to the system, as outlined above.

While various embodiments of the invention have been particularly shown and described, it will be understood by those skilled in the art that various changes in form and details may be made therein without departing from the spirit and scope of the invention as defined by the appended claims.

What is claimed is:

1. A computer-implemented method of conducting online meetings among users associated with respective physical user environments, comprising:
   gathering, by processing circuitry, sensed environment information from a set of intelligent sensor devices in the physical user environments, the sensed environment information being gathered along with meeting information describing respective online meetings in which the users participate while located in the respective physical user environments;
   storing, by the processing circuitry, the sensed environment information and meeting information in an event database; and
   configuring, by the processing circuitry, intelligent environment-control devices in the physical user environments for subsequent online meetings, the configuring including operating a stateful behavioral engine using the sensed environment information and meeting information from the event database to identify patterns of user behavior and to configure the intelligent environment-control devices according to the identified patterns of user behavior,
   wherein the operating of the stateful behavioral engine to identify patterns of user behavior includes identifying, using the sensed environment information and meeting information from the event database, use of at least one of certain lighting devices or certain adjustment of window shades at a certain user location for meetings occurring at a particular time of day, and wherein configuring the intelligent environment-control devices according to the identified patterns of user behavior includes, for a subsequent meeting involving the same user at the same user location and approximate same time of day, automatically using the same at least one of the certain lighting devices or the certain adjustment to the window shades.

2. The computer-implemented method of claim 1, wherein the intelligent sensor devices include temperature sensing devices and light sensing devices, and wherein the intelligent environment-control devices include temperature-control devices and illumination-control devices including the lighting devices.

3. The computer-implemented method of claim 1, wherein gathering sensed environment information includes reading device setting from respective sensor devices, and wherein configuring the intelligent environment-control devices includes writing device settings to the intelligent environment-control devices.

4. The computer-implemented method of claim 1, wherein the stateful behavioral engine represents spatiality of environmental conditions as well as sources of environmental conditions and configures the intelligent environment-control devices in accordance with represented spatiality of environmental conditions and sources of environmental conditions.

5. The computer-implemented method of claim 4, wherein represented spatiality of environmental conditions and sources of environmental conditions includes one or both of (1) location and direction of incoming sunlight and (2) location and intensity of artificial light.

6. The computer-implemented method of claim 1, wherein the configuring includes resetting environment-control devices to default or stored previous settings upon completion of a meeting.

7. The computer-implemented method of claim 1, further including gathering, by the processing circuitry from an enterprise directory database, information describing at least one of enterprise buildings or rooms for meetings and describing enterprise users participating in meetings, the information being used in the configuring of the environment-control devices.

8. The computer-implemented method of claim 1, wherein both the gathering and the configuring include using device communication agents to carry out device-specific communications with the sensor devices and the environment-control devices.

9. The computer-implemented method of claim 1, further including:
provide selected information to a super behavioral engine, the super behavioral engine receiving selected information from a plurality of stateful behavioral engines operating according to claim 1 and processing the received selected information to derive cross-user behavior information describing behavior for multiple users; and
receiving the cross-user behavior information from the super behavioral engine and using the received cross-user behavior information in the configuring of the environment-control devices.

10. The computer-implemented method of claim 1, further including establishing presence and identification of users in the user environments.

11. The computer-implemented method of claim 1, wherein the configuring for a given subsequent online meeting occurs dynamically after the subsequent online meeting has started.

12. The computer-implemented method of claim 11, wherein the users exert control over the use of local devices in their respective physical locations based on privacy or other concerns.

13. Online meeting server equipment, comprising:
a communications interface;
memory;
storage; and
one or more processors coupled to the communications interface, memory and storage,
wherein the memory stores computer program instructions executed by the processors to form processing circuitry causing the online meeting server equipment to perform a method of conducting online meetings among users associated with respective physical user environments, the method including:
gathering, by the processing circuitry, sensed environment information from a set of intelligent sensor devices in the physical user environments, the sensed environment information being gathered along with meeting information describing respective online meetings in which the users participate while located in the respective physical user environments;
storing, by the processing circuitry, the sensed environment information and meeting information in an event database; and
configuring, by the processing circuitry, intelligent environment-control devices in the physical user environments for subsequent online meetings, the configuring including operating a stateful behavioral engine using the sensed environment information and meeting information from the event database to identify patterns of user behavior and to configure the intelligent environment-control devices according to the identified patterns of user behavior,
wherein the operating of the stateful behavioral engine to identify patterns of user behavior includes identifying, using the sensed environment information and meeting information from the event database, use of at least one of certain lighting devices or certain adjustment of window shades at a certain user location for meetings occurring at a particular time of day, and wherein configuring the intelligent environment-control devices according to the identified patterns of user behavior includes, for a subsequent meeting involving the same user at the same user location and approximate same time of day, automatically using the same at least one of the certain lighting devices or the certain adjustment to the window shades.

14. The online meeting server equipment of claim 13, wherein the intelligent sensor devices include temperature sensing devices and light sensing devices, and wherein the intelligent environment-control devices include temperature-control devices and illumination-control devices including the lighting devices.

15. The online meeting server equipment of claim 13, wherein gathering sensed environment information includes reading device setting from respective sensor devices, and wherein configuring the intelligent environment-control devices includes writing device settings to the intelligent environment-control devices.

16. The online meeting server equipment of claim 13, wherein the stateful behavioral engine represents spatiality of environmental conditions as well as sources of environmental conditions and configures the intelligent environment-control devices in accordance with represented spatiality of environmental conditions and sources of environmental conditions.

17. The online meeting server equipment of claim 16, wherein represented spatiality of environmental conditions and sources of environmental conditions includes one or both of (1) location and direction of incoming sunlight and (2) location and intensity of artificial light.

18. The online meeting server equipment of claim 13, wherein the configuring includes resetting environment-control devices to default or stored previous settings upon completion of a meeting.

19. The online meeting server equipment of claim 13, wherein the method further includes gathering, by the processing circuitry from an enterprise directory database, information describing at least one of enterprise buildings or rooms for meetings and describing enterprise users participating in meetings, the information being used in the configuring of the environment-control devices.

20. The online meeting server equipment of claim 13, wherein both the gathering and the configuring include using device communication agents to carry out device-specific communications with the sensor devices and the environment-control devices.

21. The online meeting server equipment of claim 13, wherein the method further includes:
providing selected information to a super behavioral engine, the super behavioral engine receiving selected information from a plurality of stateful behavioral engines operating according to claim 1 and processing the received selected information to derive cross-user behavior information describing behavior for multiple users; and receiving the cross-user behavior information from the super behavioral engine and using the received cross-user behavior information in the configuring of the environment-control devices.

22. A computer program product having a non-transitory computer-readable medium storing a set of computer program instructions, the computer program instructions being executable by processing circuitry of computer equipment to cause the computer equipment to conduct online meetings among users associated with respective physical user environments, by:
  gathering, by the processing circuitry, sensed environment information from a set of intelligent sensor devices in the physical user environments, the sensed environment information being gathered along with meeting information describing respective online meetings in which the users participate while located in the respective physical user environments;
  storing, by the processing circuitry, the sensed environment information and meeting information in an event database; and
  configuring, by the processing circuitry, intelligent environment-control devices in the physical user environments for subsequent online meetings, the configuring including operating a stateful behavioral engine using the sensed environment information and meeting information from the event database to identify patterns of user behavior and to configure the intelligent environment-control devices according to the identified patterns of user behavior,
wherein the operating of the stateful behavioral engine to identify patterns of user behavior includes identifying, using the sensed environment information and meeting information from the event database, use of at least one of certain lighting devices or certain adjustment of window shades at a certain user location for meetings occurring at a particular time of day, and wherein configuring the intelligent environment-control devices according to the identified patterns of user behavior includes, for a subsequent meeting involving the same user at the same user location and approximate same time of day, automatically using the same at least one of the certain lighting devices or the certain adjustment to the window shades.

* * * * *